(12) United States Patent
Fearn et al.

(10) Patent No.: US 11,812,102 B2
(45) Date of Patent: Nov. 7, 2023

(54) GENERATION OF MEDIA STATION PREVIEWS USING A REFERENCE DATABASE

(71) Applicant: Gracenote, Inc., Emeryville, CA (US)

(72) Inventors: Pat D. Fearn, Albuquerque, NM (US); Suresh Jeyachandran, Alameda, CA (US); Damon P. Fasching, San Francisco, CA (US); Mark W. Sherman, San Leandro, CA (US)

(73) Assignee: Gracenote, Inc., Emeryville, CA (US)

( * ) Notice: Subject to any disclaimer, the term of this patent is extended or adjusted under 35 U.S.C. 154(b) by 65 days.

(21) Appl. No.: 16/718,087

(22) Filed: Dec. 17, 2019

(65) Prior Publication Data

US 2020/0221171 A1    Jul. 9, 2020

Related U.S. Application Data

(60) Provisional application No. 62/788,563, filed on Jan. 4, 2019.

(51) Int. Cl.
*H04N 7/10* (2006.01)
*H04N 7/025* (2006.01)
(Continued)

(52) U.S. Cl.
CPC ... *H04N 21/44016* (2013.01); *H04N 21/2387* (2013.01); *H04N 21/278* (2013.01);
(Continued)

(58) Field of Classification Search
CPC ............. H04N 21/2387; H04N 21/278; H04N 21/439; H04N 21/44016; H04N 21/4524; H04N 21/47217; H04N 21/812
See application file for complete search history.

(56) References Cited

U.S. PATENT DOCUMENTS 7,509,089 B2    3/2009  Kikkoji et al.
8,756,507 B2 *  6/2014  Fong ................... H04N 21/482
                                                      715/727
(Continued)

FOREIGN PATENT DOCUMENTS

JP    2002101405 A    4/2002
JP    2004343313 A    12/2004
(Continued)

OTHER PUBLICATIONS

International Search Report received for PCT Patent Application No. PCT/US2019/068521, dated May 28, 2020, 5 pages.

(Continued)

*Primary Examiner* — Gigi L Dubasky
(74) *Attorney, Agent, or Firm* — McDonnell Boehnen Hulbert & Berghoff LLP

(57) ABSTRACT

In one aspect, an example method includes (i) while a media playback device of a vehicle is playing back content received on a first channel, sending, by the media playback device to a server, a preview request, the preview request identifying a second channel that is different from the first channel; (ii) receiving, by the media playback device from the server, a response to the preview request, the response including identifying information corresponding to content being provided on the second channel; and (iii) while the media playback device is playing back the content received on the first channel, providing, by the media playback device for display, at least a portion of the identifying information corresponding to content being provided on the second channel.

19 Claims, 5 Drawing Sheets

(51) Int. Cl.
*H04N 21/44* (2011.01)
*H04N 21/472* (2011.01)
*H04N 21/2387* (2011.01)
*H04N 21/278* (2011.01)
*H04N 21/45* (2011.01)
*H04N 21/81* (2011.01)
*H04N 21/439* (2011.01)

(52) U.S. Cl.
CPC ....... *H04N 21/439* (2013.01); *H04N 21/4524* (2013.01); *H04N 21/47217* (2013.01); *H04N 21/812* (2013.01)

(56) References Cited

U.S. PATENT DOCUMENTS

| | | | |
|---|---|---|---|
| 2005/0020223 A1* | 1/2005 | Ellis | H04M 1/6083 455/352 |
| 2006/0084376 A1* | 4/2006 | Yamashita | H04H 60/44 455/3.01 |
| 2006/0276124 A1* | 12/2006 | Kikkoji | H04H 60/73 455/3.01 |
| 2007/0201837 A1 | 8/2007 | Meguro et al. | |
| 2007/0237183 A1* | 10/2007 | Chang | H04N 21/4345 370/252 |
| 2008/0307458 A1* | 12/2008 | Kim | H04N 21/4622 725/38 |
| 2009/0063975 A1* | 3/2009 | Bull | G06F 16/68 707/999.005 |
| 2010/0046919 A1 | 2/2010 | Song | |
| 2013/0024895 A1* | 1/2013 | Yong | G06F 3/04842 725/41 |
| 2013/0102242 A1* | 4/2013 | Anzures | H04H 60/63 455/3.06 |
| 2015/0227905 A1 | 8/2015 | Rivera et al. | |
| 2016/0021417 A1 | 1/2016 | Wang et al. | |

FOREIGN PATENT DOCUMENTS

| | | |
|---|---|---|
| KR | 2006-0052794 A | 5/2006 |
| KR | 2008-0107893 A | 12/2008 |
| KR | 10-2009-0038706 A | 4/2009 |
| WO | 200506615 A1 | 1/2005 |
| WO | 2017184963 A1 | 10/2017 |

OTHER PUBLICATIONS

Written Opinion received for PCT Patent Application No. PCT/US2019/068521, dated May 28, 2020, 7 pages.

Robert Struble, et al., AM & FM's digital conversion: how HD radio TM will spur innovative telematics services for the automotive industry, IEEE Vehicular Technology Magazine (vol. 1, Issue: 1, Mar. 2006), vol. 1, Issue: 1, 米国,, IEEE, 2006年07月31日,, pp. 18-22, https://ieeexplore.ieee.org/stamp/stamp.jsp?tp=&arnumber=1663947.

Office Action for Japanese Patent Application No. 2021-536709, dated Jul. 27, 2022.

* cited by examiner

GENERATION OF MEDIA STATION PREVIEWS USING A REFERENCE DATABASE

CROSS-REFERENCE TO RELATED APPLICATIONS

This disclosure claims priority to U.S. Provisional Patent App. No. 62/788,563, filed on Jan. 4, 2019, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

Some media playback devices can display identifying information for content being played back on a channel while the content is being played back. For instance, while a radio is playing a song, a user interface of the radio can display textual information identifying a title, artist, and album of the song.

A communications protocol referred to as Radio Data System (RDS) allows broadcasters to send identifying information to radios through analog radio waves. Some radio stations transmit audio and other information using digital technology. Transmitting audio and other information over a digital signal allows a radio station to transmit additional types of identifying information, such as album images and artist images. A radio that is capable of receiving digital signals can display a received image that is associated with a song while the radio plays the song.

SUMMARY

In one aspect, an example method is disclosed. The method includes (i) while a media playback device of a vehicle is playing back content received on a first channel, sending, by the media playback device to a server, a preview request, the preview request identifying a second channel that is different from the first channel; (ii) receiving, by the media playback device from the server, a response to the preview request, the response including identifying information corresponding to content being provided on the second channel; and (iii) while the media playback device is playing back the content received on the first channel, providing, by the media playback device for display, at least a portion of the identifying information corresponding to content being provided on the second channel.

In another aspect, an example non-transitory computer-readable medium is disclosed. The computer-readable medium has stored thereon program instructions that upon execution by a processor, cause performance of a set of acts including (i) while a media playback device of a vehicle is playing back content received on a first channel, sending, by the media playback device to a server, a preview request, the preview request identifying a second channel that is different from the first channel; (ii) receiving, by the media playback device from the server, a response to the preview request, the response including identifying information corresponding to content being provided on the second channel; and (iii) while the media playback device is playing back the content received on the first channel, providing, by the media playback device for display, at least a portion of the identifying information corresponding to content being provided on the second channel.

In another aspect, an example computing system is disclosed. The computing system is configured for performing a set of acts including (i) while a media playback device of a vehicle is playing back content received on a first channel, sending, by the media playback device to a server, a preview request, the preview request identifying a second channel that is different from the first channel; (ii) receiving, by the media playback device from the server, a response to the preview request, the response including identifying information corresponding to content being provided on the second channel; and (iii) while the media playback device is playing back the content received on the first channel, providing, by the media playback device for display, at least a portion of the identifying information corresponding to content being provided on the second channel.

DETAILED DESCRIPTION

I. Overview

Currently, while a media playback device of a vehicle is playing back content received on a first channel, it is difficult to know what content is being provided on other channels that are different from the first channel without tuning away from the first channel. For instance, when listening to content being played back on a first channel by a radio, it is difficult to know what content is being provided on other channels that are different from the first channel without tuning away from the first channel. Similarly, when a user is not interested in content that a media playback device is playing back on a first channel, it is difficult for the user to find content on another channel that the user is interested in without successively tuning in to multiple channels. When searching for different content, the user might not know what content is being provided on another channel before the user tunes in to the channel.

Disclosed herein are methods and systems to address this and potentially other issues. In an example method, while a media playback device of a vehicle is playing back content received on a first channel, the media playback device can send a preview request to a server. The preview request may identify a second channel that is different from the first channel. The media playback device can then receive from the server a response to the preview request. The response may include identifying information corresponding to content being provided on the second channel. Further, while the media playback device is playing back the content received on the first channel, the media playback device can provide for display at least a portion of the identifying information corresponding to content being provided on the second channel. In this manner, while the media playback device is playing back content received on the first channel, a display can provide an indication of content that is being provided on the second channel, so that a user of the media playback device can decide whether to tune away from the first channel and to the second channel.

While portions of this disclosure refer to media playback devices that are located in vehicles, the examples are not meant to be limiting. The systems and methods disclosed herein are also applicable to media playback devices that are not located in vehicles, such as portable media playback devices and media playback devices that are located in homes, offices, or other buildings.

In addition, while portions of this disclosure refer to media playback devices that provide audio content, the examples are not meant to be limiting. The systems and methods are also applicable to media playback devices that provide video content.

II. Example Architecture

A. Computing Device

Figure 1:
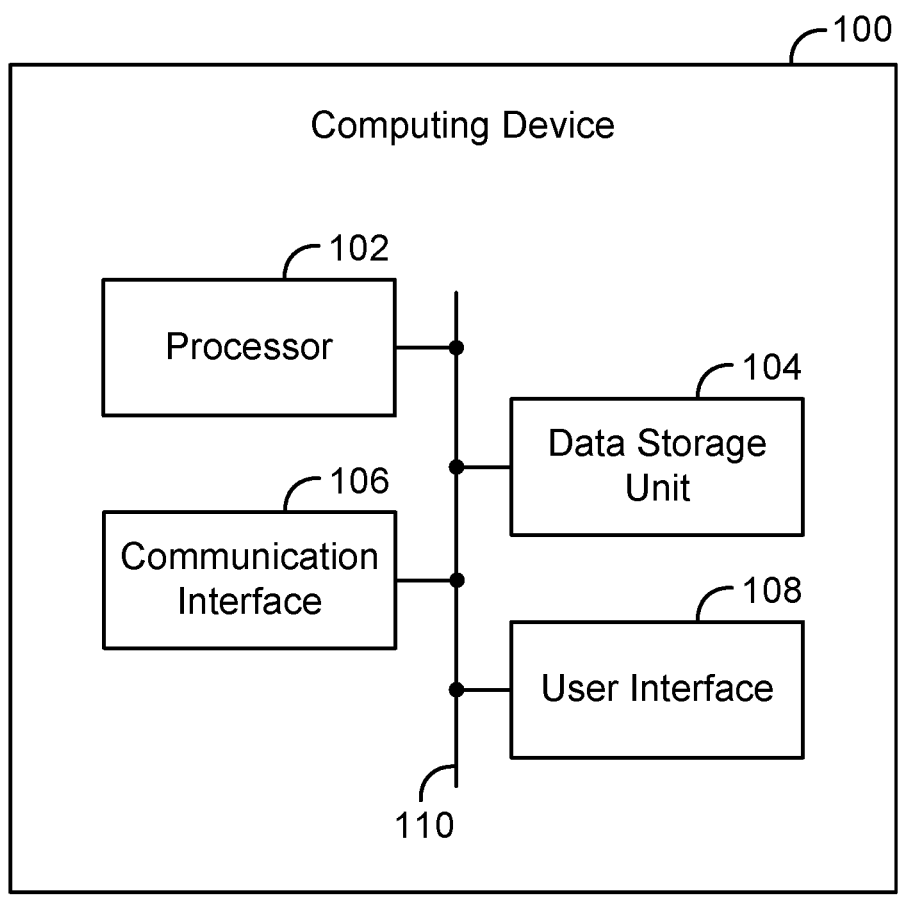
FIG. 1 is a simplified block diagram of an example computing device.

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

B. Media Preview System

Figure 2:
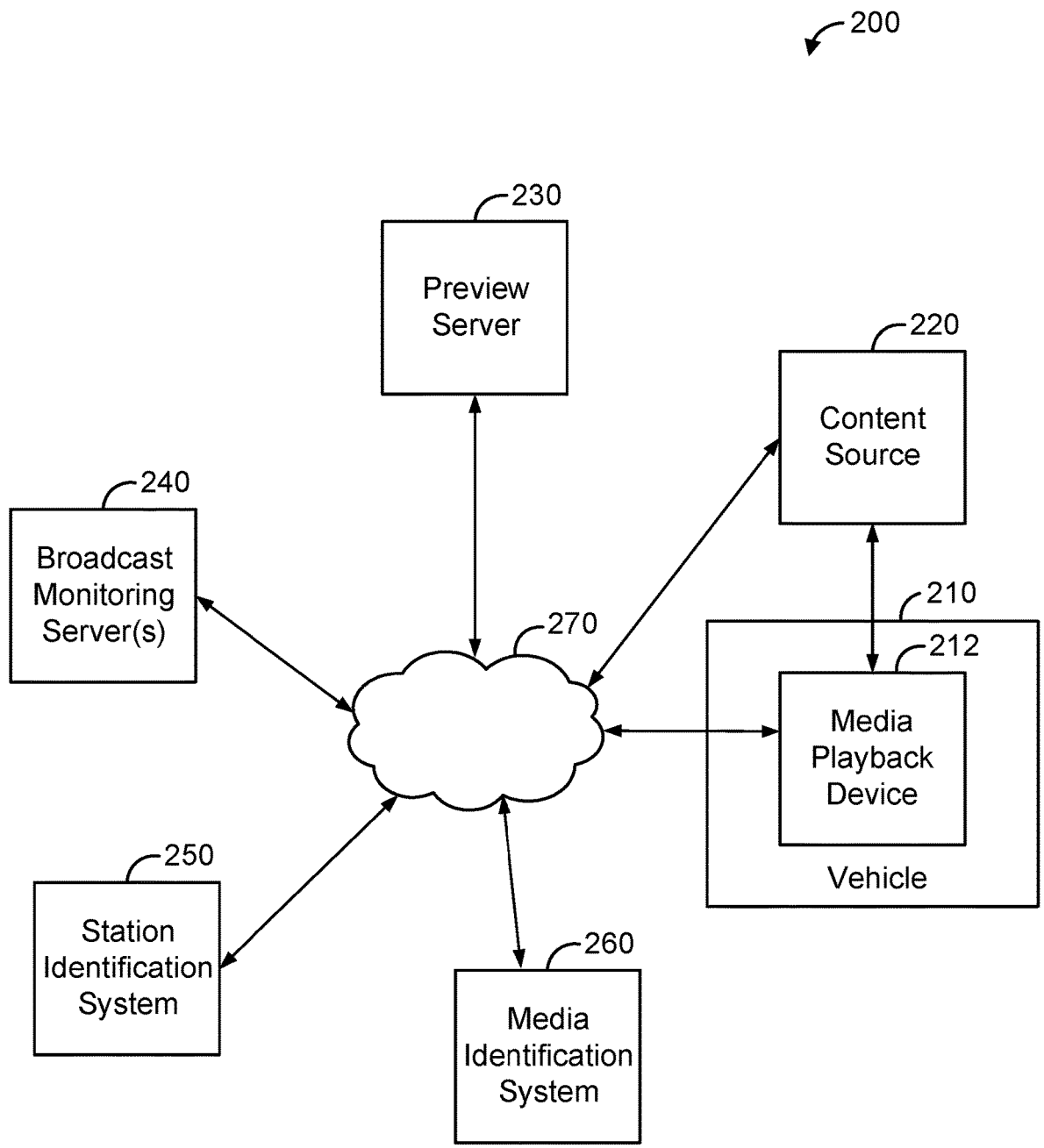
FIG. 2 is a simplified block diagram of an example media preview system.

FIG. 2 is a simplified block diagram of an example media preview system 200. Media preview system 200 can perform various acts and/or functions related to the delivery and/or presentation of identifying information for media content (e.g., audio content and/or video content), and can be implemented as a computing system.

Media preview system 200 can include various components, such as a vehicle 210, content source 220, preview server 230, one or more broadcast monitoring servers 240, station identification system 250, and media identification system 260. Vehicle 210 can include a media playback device 212. Each of media playback device 212, preview server 230, broadcast monitoring server(s) 240, station identification system 250, and media identification system 260 can be implemented as a computing system.

Vehicle 210 can be a machine that transports people, such as an automobile, motorcycle, watercraft, or aircraft, for instance. Media playback device 212 of vehicle 210 can include at least one computing device and can take various forms. By way of example, media playback device 212 can include a head unit of vehicle 210. The head unit can include a display and a user interface that provide a user of vehicle 210 with control over media content presented by vehicle 210. Although FIG. 2 depicts media playback device 212 as being located in vehicle 210, in other media preview systems, a media playback device might not be located in a vehicle. For instance, other examples of media playback devices include radios, televisions, smart speakers, and smart displays.

Media playback device 212 can receive audio content, video content, and/or text content from content source 220, and can receive this content either directly from content source 220 or indirectly by way of a network 270. Content source 220 can include a radio station, television station, or web server. For example, content source 220 may be a radio station or radio network that streams or transmits audio over a channel to media playback device 212, a television (TV) station or TV network that streams or transmits media over a channel to media playback device 212, and/or a web service that streams or transmits media over network 270 to media playback device 212.

Accordingly, media playback device 212 can include a tuner configured to receive an input stream of media content and generate an output stream of media content by processing the input stream. Media playback device 212 can be equipped with tuners, decoders, and other hardware and/or software such that media playback device 212 can access media content that is broadcast by content source 220. Additionally or alternatively, media playback device 212 can be equipped with network adapters, decoders, and other hardware and/or software such that media playback device 212 can access media content that is distributed through a wide area network (e.g., the internet).

Media playback device 212 can also include a display or other user interface configured to display identifying information corresponding to media content being provided on one or more respective channels. The display may be a flat-panel screen, a plasma screen, a light emitting diode (LED) screen, or a liquid crystal display (LCD).

In line with the discussion above, while media playback device 212 is playing back content received on a first channel, media playback device 212 can send a preview request to preview server 230. The preview request can identify one or more channels that are different from the channel. By way of example, media playback device 212 can be playing back audio content received on a given radio station, and send a preview request that identifies one or more other radio stations. As another example, media playback device 212 can be playing back video content received on a given channel, and send a preview request that identifies one or more other channels.

In some instances, the preview request can include a station identifier of a second channel. The station identifier can be a call sign of a radio station or a television station, for instance. Additionally or alternatively, the preview request can include a frequency of a second channel and a geographic location of media playback device 212.

Media playback device 212 can periodically transmit the preview request to preview server 230. For instance, media playback device 212 can send the preview request every five or ten seconds, or every minute.

Preview server 230 can maintain a database that maps a plurality of channels to identifying information corresponding to content being provided on the plurality of channels. As an example, preview server 230 can maintain a database mapping radio stations to audio content (e.g. songs or shows) currently being broadcast by the radio stations. As another example, preview server 230 can maintain a database mapping television stations to video content currently being broadcast by the television stations. As described more fully below, preview server 230 can update the database using data that is received from broadcast monitoring server(s) 240, station identification system 250, and media identification system 260.

Broadcast monitoring server(s) 240 can provide to preview server 230 data related to content that is being provided on the plurality of channels. For example, broadcast monitoring server(s) 240 can periodically or upon request provide to preview server 230 a list of channels and corresponding content that is being provided on those channels. In some examples, broadcast monitoring server(s) 240 can identify content that is being provided on the channels using audio or video fingerprinting. Additionally or alternatively, broadcast monitoring server(s) 240 can identify audio content being provided on one or more channels based on data provided by programming software that radio stations utilize to program which songs are played. In some examples, broadcast monitoring server(s) 240 can provide to preview server 230 a media sample that is being provided on a channel.

In the database that preview server 230 maintains, each channel can be assigned a unique identifier for indexing purposes. The unique identifier can be a unique number, for instance. Station identification system 250 can be configured to receive a channel identifier from preview server 230, determine a unique identifier corresponding to the channel identifier, and provide the unique identifier to preview server 230. Station identification system 250 can convert channel identifiers to unique identifiers using mapping data. For instance, station identification system 250 can convert a radio station call sign to a unique identifier using mapping data that maps call signs to unique identifiers. As another example, station identification system 250 can convert a channel frequency and a geographic location to a unique identifier using mapping data that maps channel frequencies and associated geographic locations to unique identifiers.

Media identification system 260 can provide to preview server 230 identifying information corresponding to content being provided on one or more second channels. For instance, media identification system 260 can maintain a database mapping song titles to identifying information. As another example, media identification system can maintain a database mapping video titles to identifying information. With this approach, preview server 230 can provide the title of media content being provided on a channel to media identification system 260. Media identification system 260 can then determine identifying information corresponding to the title of the media content using the database, and provide the identifying information to preview server 230.

Additionally or alternatively, preview server 230 can provide a media sample of content being provided on a channel to media identification system 260. With this approach, media identification system 260 can identify the content from the media sample using fingerprinting, and determine identifying information corresponding to the identified content.

The identifying information that media identification system provides to preview server 230 can take various forms. For example, the identifying information can include a media unique identifier (e.g., a track unique identifier (TUI). For audio content, the identifying information can include a track title, album title, and artist name. Additionally or alternatively, the identifying information can include an album image (e.g., cover art) or artist image. The identifying information can also include a program identifier that identifies an audio program. Similarly, for video content, the identifying information can include a title and a program identifier that identifies a video program. In some instances, the content being provided on one of the second channels can include a sporting event, and the identifying information can include time and score information for the sporting event.

After receiving the preview request, preview server 230 can query the database to correlate one or more channels identified in the preview request (or related to a channel identified in the preview request) to identifying information corresponding to content being provided on the one or more channels. Preview server 230 can then send a response to the preview request to media playback device 212. The response can include identifying information corresponding to content being provided on the one or more channels identified in the preview request.

After receiving the response, media playback device 212 can provide at least a portion of the identifying information for display. Media playback device 212 can provide for display identifying information corresponding to content being provided on one or more second channels while the media playback device is playing back content that is received on a first channel.

Additionally or alternatively, media playback device 212 can provide at least a portion of the identifying information to another device for display. For instance, media playback device 212 can provide a portion of the identifying information to another component of vehicle 210 for display.

Network 270 may be any network that enables communication between devices, such as a wired network and/or a wireless network (e.g., a mobile network).

Figure 3:
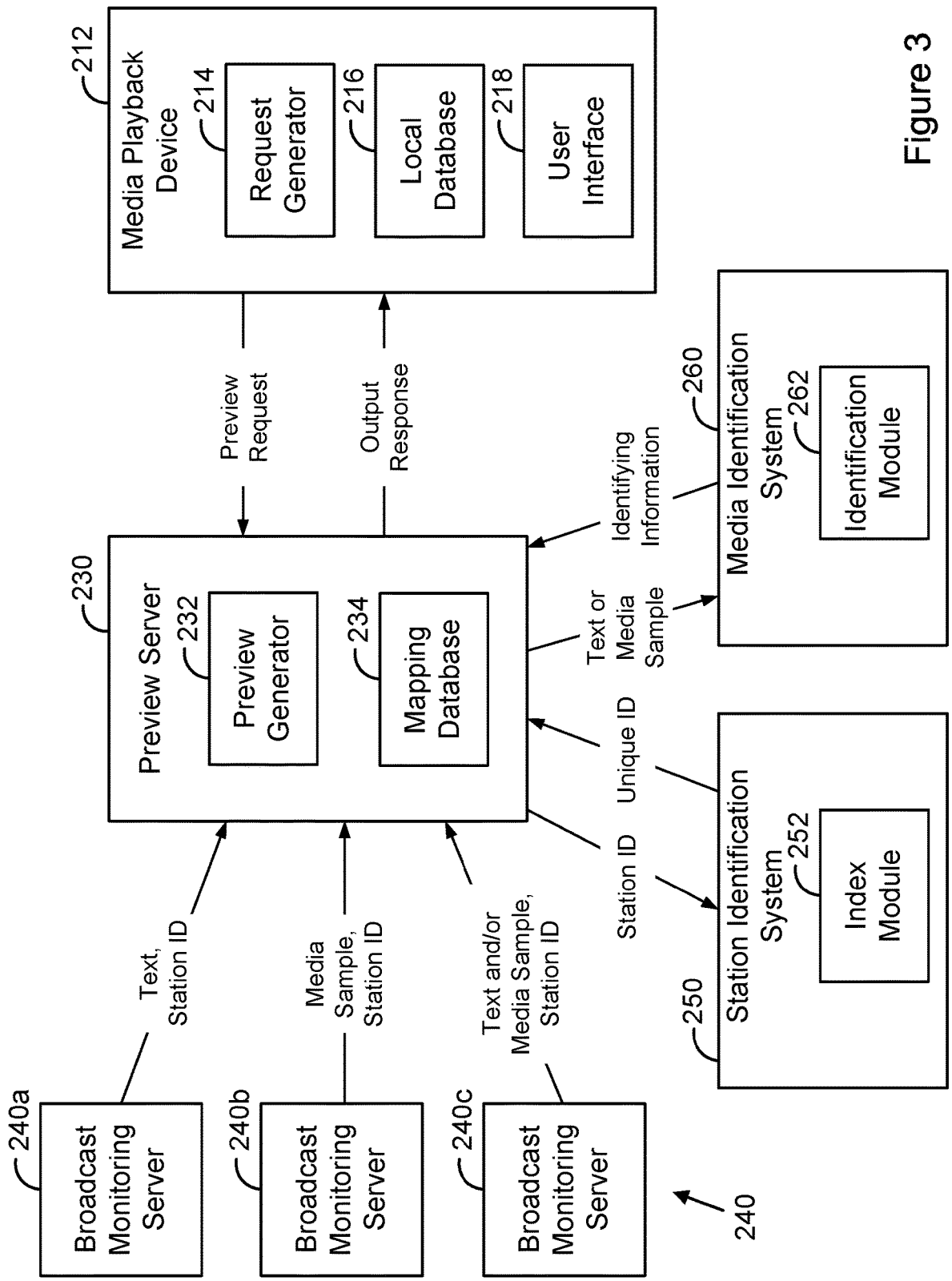
FIG. 3 is a simplified block diagram illustrating components of a preview server, media playback device, broadcast monitoring server, station identification system, and media identification system, according to an example embodiment.

FIG. 3 is a simplified block diagram illustrating components of media playback device 212, preview server 230, broadcast monitoring server(s) 240, station identification system 250, and media identification system 260. As shown in FIG. 3, media playback device 212 includes a request generator 214, a local database 216, and a user interface 218, all configured to communicate with each other (e.g., via a bus, shared memory, or switch). Further, preview server 230 includes a preview generator 232 and a mapping database 234, configured to communicate with each other. Still further, station identification system 250 includes an index module 252, and media identification system 260 includes an identification module 262. Still further, broadcast monitoring server(s) 240 includes a broadcast monitoring server 240a, a broadcast monitoring server 240b, and a broadcast monitoring server 240c.

One or more of the components depicted in FIG. 3 can be implemented using hardware (e.g., a processor of a machine, a field-programmable gate array (FPGA), or an application-specific integrated circuit (ASIC), or a combination of hardware and software. Moreover, any two or more of the components depicted in FIG. 3 can be combined into a single component, and the function described herein for a single component can be subdivided among multiple components.

In line with the discussion above, broadcast monitoring servers 240a, 240b, and 240c can provide data related to content being provided on various channels to preview server 230. More particularly, as shown in FIG. 3, broadcast monitoring server 240a can provide data in the form of text and station identifier pairings for multiple channels. For instance, for each pairing, the text can include a song title and artist as well as a channel identifier for a channel on which the song is being provided. Alternatively, for each pairing, the text can include a video title as a well as a channel on which the video is being provided.

Broadcast monitoring server 240a can determine the pairings using audio and/or video fingerprinting. Fingerprinting can involve obtaining a query fingerprint from a sample of media content, comparing the query fingerprint to known reference fingerprints, and determining that the query fingerprint matches at least one known reference fingerprint. Determining that the query fingerprint matches at least one known fingerprint can involve determining that a similarity between the query fingerprint and at least one of the known reference fingerprints satisfies a predetermined threshold. The predetermined threshold can be associated with a Tanimoto distance measurement, a Manhattan distance measurement, or other distance measurements. Broadcast monitoring server 240a can also use other matching techniques, such as Euclidian, Cosine, KL-Divergence, and/or Itakura matching techniques, to match the query fingerprint to at least one known reference fingerprint.

Broadcast monitoring server 240b can provide data in the form of media sample and station identifier pairings for one or more channels. For example, for one or more channels, broadcast monitoring server 240b may publish media samples of content that is being provided on the respective channels along with station identifiers for the respective channels. Each sample can include multiple frames of audio content or multiple frames of video content.

Broadcast monitoring server 240c can provide data in the form of text and/or media sample and station identifier pairings. In one example, broadcast monitoring server 240c can identify audio content being provided on one or more channels based on data provided by programming software that radio stations utilize to program which songs are played. After a radio station begins playing a song, the programming software can publish data regarding the song. Broadcast monitoring server 240c can access the published data to determine the song. The published data can include text and/or a media sample for each of one or more channels.

Data received by preview server 230 from broadcast monitoring servers 240a, 240b, and 240c can be used to populate mapping database 235. In some examples, populating mapping database 234 using data obtained from multiple different broadcast monitoring servers can allow preview server 230 to establish a robust database that maps channels to content. For instance, preview server 230 can retrieve a first set of data for a first set of channels from broadcast monitoring server 240a, and preview server 230 can retrieve a second set of data for a second set of channels form broadcast monitoring server 240b, with the second set of channels including some channels that are not included in the first set of channels.

Upon receiving text and/or media sample and station identifier pairings for one or more channels, preview server 230 can communicate with media identification system 260 to determine identifying information for the content being provided on the channels represented within the pairings. More particularly, for each of one or more channels represented by the pairings, preview server 230 can send to identification module 262 of media identification system 260 the text or media sample corresponding to the channel. Identification module 262 can then process the text or media sample for each channel, and determine identifying information corresponding to the text or media sample. For instance, identification module 262 can match received text to an item of media content represented in a database of media identification system 260, and determine a media unique identifier (e.g., a track unique identifier) corresponding to the item of media content. Alternatively, identification module 262 can identify an item of media content that includes a received media sample using audio or video fingerprinting, and determine a media unique identifier corresponding to the item of media content.

After identifying an item of media content corresponding to text and/or a media sample, identification module 262 can provide the media unique identifier for the item of media content to preview server for storage in mapping database 234 of preview server 230. Instead of or in addition to the media unique identifier, identification module 262 can provide other identifying information associated with an item of media content to preview server 230. By way of example, for audio content, the identifying information can include a track title, album title, and artist name. Additionally or alternatively, the identifying information can include an album image (e.g., cover art) or artist image. The identifying information can also include a program identifier that identifies an audio program. Similarly, for video content, the identifying information can include a title and a program identifier that identifies a video program. In some instances, the content being provided on one of the second channels can include a sporting event, and the identifying information can include time and score information for the sporting event.

Upon receiving text and/or media sample pairings for one or more channels, preview server 230 can also communicate with station identification system 250 to determine unique identifiers for the channels represented within the pairings. More particularly, for each of one or more channels represented by the pairings, preview server 230 can send to index module 252 of station identification system 262 a channel identifier of the channel. Index module 252 can then use mapping data to convert the channel identifier to a unique identifier, and provide the unique identifier to preview server 230. Preview server 230 can then use the unique identifier to store identifying information for the channel in mapping database 234.

The identifying information stored in mapping database 234 for each channel may be updated when broadcast monitoring servers 240a, 240b, and 240c provide new data to preview server 230. In some instances, one or more of broadcast monitoring servers 240a, 240b, and 240c may periodically push data to preview server 230. Alternatively, preview server 230 can periodically pull data from one or more of broadcast monitoring servers 240a, 240b, and 240c.

While media playback device 212 is playing back content received on a first channel, request generator 214 of media playback device 210 can generate a preview request and provide the preview request to preview server 230. The preview request can identify one or more second channels that are different from the first channel. In some examples, the preview request can include a station identifier for each of the one or more second channels. The station identifier(s) can be call signs, for instance. Additionally or alternatively, the preview request can include a frequency of a second channel and a geographic location of the media playback device 212.

Request generator 214 can select the second channel(s) identified in the preview request in various ways. As one example, request generator 214 can select the second channels of the preview request based on a characteristic of the first channel. For instance, based on the first channel being associated with a first genre (e.g., blues, jazz, country, etc.), request generator 214 can select channels that are also associated with the first genre. As another example, request generator 214 can select the channels of the preview request based on channels that are programmed as presets of media playback device 212. As still another example, request generator 214 can select as the second channels one or more other channels that are located within a frequency range or channel range of the first channel. For instance, request generator 214 can select the next two adjacent channels that are above the first channel and the next two adjacent channels that are below the first channel. If the first channel is channel 124, request generator 214 could select channels 122, 123, 125, and 126. Or if the first channel is assigned to a frequency of 98.1 megahertz (MHz), request generator 214 could select second channels assigned to frequencies of 96.9 MHz, 97.3 MHz, 98.9 MHz, and 99.5 MHz based on those channels being the channels that are adjacent to the first channel in a particular geographic area.

Upon receiving the preview request, preview generator 232 of preview server 230 can retrieve identifying information corresponding to content being provided on one or more channels identified in the preview request, and provide the identifying information to media playback device 212 in an output response. To facilitate this retrieval, preview generator 232 can send one or more channel identifiers for channels listed in the preview request to station identification system 250. Index module 252 of station identification system 250 can then respond to preview generator 232 with unique identifiers for the channels.

Further, preview generator 232 can then use the unique identifiers to retrieve identifying information for the channels from mapping database 234. After obtaining the identifying information, preview generator 232 can generate an output response that includes identifying information for the channels, and provide the output response to media playback device 212. The output response can be in the form of text data, such as a listing of channels and corresponding identifying information. The identifying information can include one or more links to image data, such as a link to album art or a link to an image of a song artist or an image of a program host.

In some examples, preview generator 232 might not be able to retrieve identifying information for a channel identified in the preview request. Upon determining that identifying information for a channel is unavailable, the preview generator 232 can add the channel to a list or increment a count associated with the channel. This data regarding how often identifying information for a channel is requested but unavailable can be stored by preview server 230 and, upon request, can be provided to one of broadcast monitoring servers 240a, 240b, or 240c. The broadcast monitoring server that receives the data can then enhance their service, by adding the station to a list of stations that are monitored by the broadcast monitoring server.

Upon receiving the output response, media playback device 212 can store the identifying information for the channels in local database 216 of media playback device 212. Media playback device 212 can display a portion of the identifying information using user interface 218. For example, media playback device 212 can display respective identifying information for multiple channels in respective user interface elements (e.g., respective tiles) corresponding to each channel of the multiple channels. The identifying information can be displayed in a now-playing guide that is accessible via user interface 218. In some instances, the identifying information can be displayed adjacent to identifying information for the first channel. Alternatively, when the identifying information is displayed, identifying information for the first channel might not be visible within user interface 218.

In some instances, the preview request can identify the first channel on which media playback device 212 is playing back content rather than identifying one or more second channels that are different from the first channel. With this approach, preview generator 232 can select one or more second channels based on the first channel, determine identifying information corresponding to content being provided on the one or more second channels, and send the identifying information to media playback device 212 within an output response. For example, preview server 230 can determine that the first channel is associated with a first genre, and select one or more second channels that are also associated with the second genre. Alternatively, preview server 230 can determine that the first channel is associated with a first geographic location (e.g., a first city), and select one or more second channels that are popular in the first city.

Further, in some instances, upon receiving a preview request, preview generator 232 can also select an advertisement, and send the advertisement to media playback device 212 within the output response. Media playback device 212 can then provide the advertisement for display when displaying identifying information that is included within the output response. An owner of an item of media content or a third party may pay a fee to associate an advertisement with the item. With this arrangement, preview generator 232 can determine that an item of media content that is playing on a channel has an associated advertisement and that identifying information for the item of media content will be provided to media playback device 212 in an output response. Based on making this determination, preview generator 232 can include the advertisement in the output response, for display in conjunction with the identifying information.

Other advertisement arrangements are also possible. For instance, a third party may pay a fee to associate an advertisement with a particular channel or group of channels. Upon determining that identifying information for one of the channels is to be included in an output response, preview generator 232 can then select the advertisement for inclusion in the output response.

Figure 4:
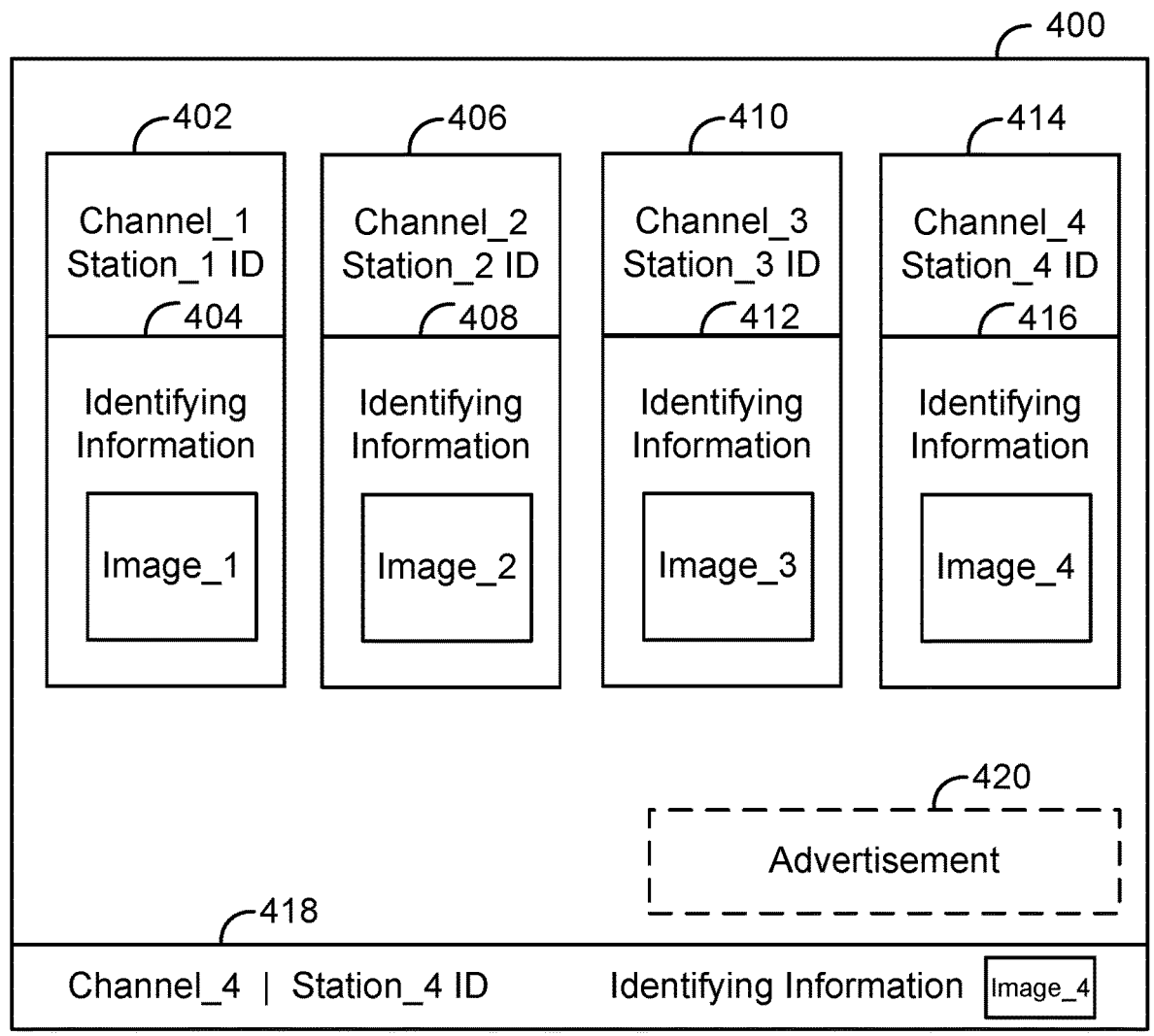
FIG. 4 illustrates an example display provided by a media playback device.

FIG. 4 illustrates an example display 400 that a media playback device, such as media playback device 212, can provide. As shown in FIG. 4, display 400 includes four identification elements 402, 406, 410, and 414 corresponding to four respective identifying-information tiles 404, 408, 412, 416. Each of the identification elements 402, 406, 410, and 414 displays data indicative of a respective channel. The data indicative of a respective channel can, for example, include a frequency, channel name, channel identifier (e.g., call sign), genre, and/or channel logo.

Further, each of the identifying-information tiles 404, 408, 412, and 416 displays identifying information for content being provided on a corresponding channel. In particular, identifying-information tile 404 displays identifying information for content being provided on a first channel identified by identification element 402, identifying-information tile 408 displays identifying information for content being provided on a second channel identified by identification element 406, identifying-information tile 412 displays identifying information for content being provided on a third channel identified by identification element 410, and identifying-information tile 416 displays identifying information for content being provided on a fourth channel identified by identification element 414. Hence, display 400 may allow a user of the media playback device to visually browse what's playing across multiple channels, thereby simplifying media content search and discovery.

For the display 400, the fourth channel is the currently selected channel. In other words, the media playback device displays identification elements 402, 406, 410, and 414 and identifying-information tiles 404, 408, 412, and 416 while the media playback device is playing back content that is received on the fourth channel. To notify a user that media playback device is playing back content that is received on the fourth channel, data indicative of the fourth channel and identifying information for the content being provided on the fourth channel is displayed in a current-channel element 418.

Further, each identification element 402, 406, 410, and 414 and/or each identifying-information tile 404, 408, 412, and 416 may be selectable by a user of the media playback device. For instance, a user can select identification element 402 or identifying-information tile 404 to cause the media playback device to switch from the fourth channel tune to the first channel.

In other examples, the media playback device might be playing back content that is received on a fifth channel that is different from each of the first channel, second channel, third channel, and fourth channel. With this approach, data indicative of the fifth channel and identifying information for the content being provided on the fifth channel can be displayed in the current-channel element 418 (not shown).

As further shown in FIG. 4, display 400 can optionally include an advertisement 420. The advertisement may include text and/or an image, for instance. The advertisement may have been provided to the media playback device along with the identifying information that is being displayed in the identifying-information tiles 404, 408, 412, and 416.

III. Example Operations

Figure 5:
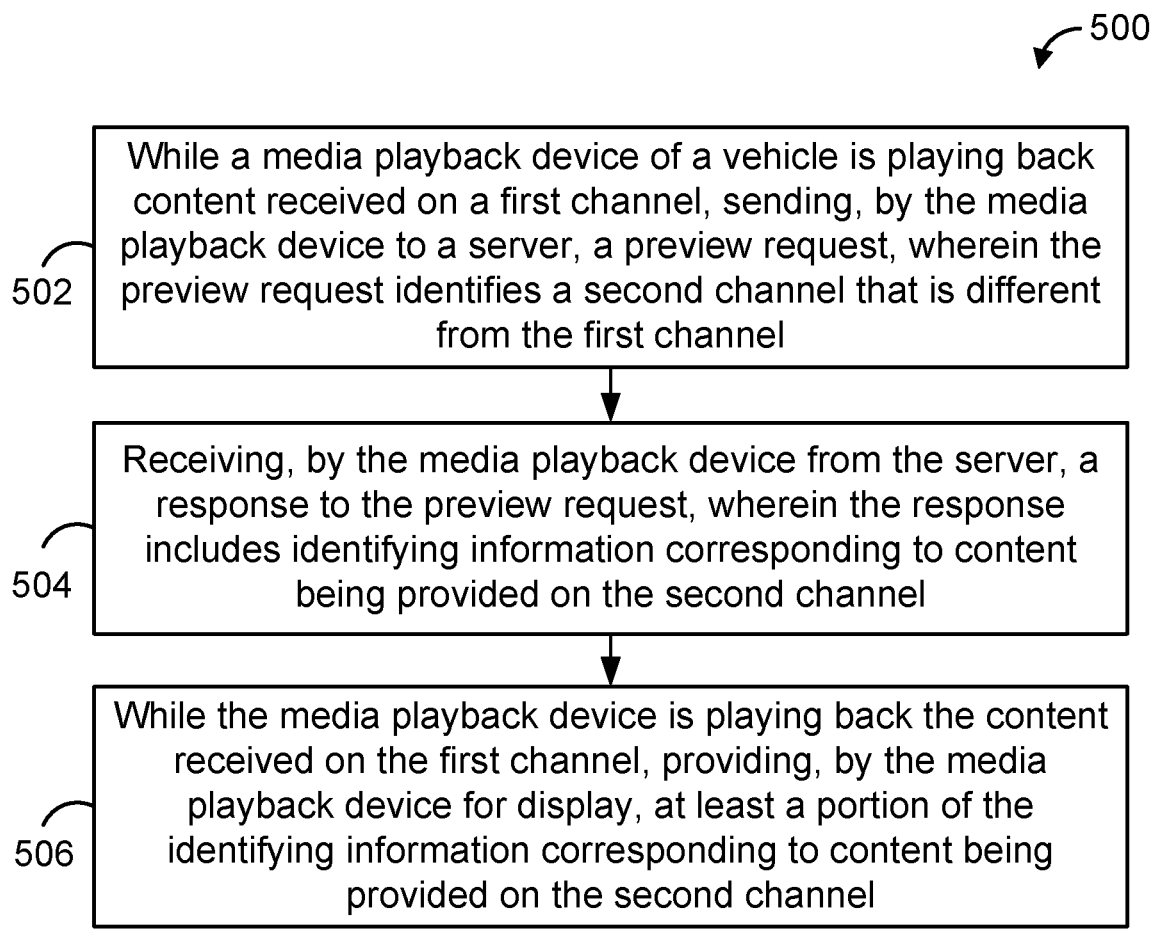
FIG. 5 is a flow chart of an example method.

FIG. 5 is a flow chart of an example method 500. Method 500 can be carried out by a media playback device, such as media playback device 212 or more generally, by a computing system. At block 502, method 500 includes while a media playback device of a vehicle is playing back content received on a first channel, sending, by the media playback device to a server, a preview request. The preview request identifies a second channel that is different from the first channel. At block 504, method 500 includes receiving, by the media playback device from the server, a response to the preview request. The response includes identifying information corresponding to content being provided on the second channel. And at block 506, method 500 includes while the media playback device is playing back the content received on the first channel, providing, by the media playback device for display, at least a portion of the identifying information corresponding to content being provided on the second channel.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
    while a media playback device of a vehicle is playing back content broadcast by a first broadcast station on a first channel:
        determining, by the media playback device, that the first channel is associated with a first genre,
        determining, by the media playback device, that a second channel is associated with the first genre and has a frequency within a threshold frequency range from the first channel,
        in response to determining that the first channel is associated with the first genre, selecting, by the media playback device, from a plurality of channels different from the first channel, the second channel based on the second channel being associated with the first genre of the first channel and the second channel having a frequency within the threshold frequency range from the first channel, and
        in response to selecting the second channel based on the second channel being associated with the first genre of the first channel, sending, by the media playback device to a server, a preview request identifying a call sign of a second broadcast station that broadcasts content on the second channel;
    receiving, by the media playback device from the server, a response to the preview request, wherein the response includes identifying information corresponding to content being broadcast on the second channel; and
    while the media playback device is playing back the content broadcast on the first channel, providing, by the media playback device for display, at least a portion of the identifying information corresponding to content being broadcast on the second channel.

2. The method of claim 1, wherein the content broadcast on the first channel is audio content.

3. The method of claim 1, wherein the content broadcast on the first channel is video content.

4. The method of claim 1, wherein the preview request comprises a frequency of the second channel and a geographic location of the media playback device.

5. The method of claim 1:
    wherein the preview request identifies a set of second channels that includes the second channel, and
    wherein the response includes respective identifying information corresponding to respective content being broadcast on each channel of the set of second channels.

6. The method of claim 5, further comprising selecting channels of the set of second channels based on the channels being programmed as presets of the media playback device.

7. The method of claim 1, wherein the identifying information corresponding to the content being broadcast on the second channel comprises a media unique identifier.

8. The method of claim 1, wherein the identifying information corresponding to the content being broadcast on the second channel comprises a track title, album title, and artist name.

9. The method of claim 1, wherein the identifying information corresponding to the content being broadcast on the second channel comprises a program identifier.

10. The method of claim 1, wherein the identifying information corresponding to the content being broadcast on the second channel comprises a link to an image.

11. The method of claim 1, wherein providing the at least a portion of the identifying information for display comprises providing the at least a portion of the identifying information for display on a user interface of the media playback device.

12. The method of claim 1:
    wherein the server maintains a database mapping a plurality of channels to identifying information corresponding to content being broadcast on the plurality of channels, and
    wherein the identifying information corresponding to the content being broadcast on the second channel is retrieved from the database.

13. The method of claim 1:
    wherein the response includes an advertisement, and
    wherein the method further comprises providing, by the media playback device for display, the advertisement.

14. The method of claim 1, further comprising:
    determining, by the media playback device, that the second channel has a channel indicator within a threshold channel indicator range from the first channel,
    wherein selecting the second channel is further based on the second channel having a channel indicator within the threshold channel indicator range from the first channel.

15. A non-transitory computer-readable medium having stored thereon program instructions that upon execution by a processor, cause performance of a set of acts comprising:
    while a media playback device of a vehicle is playing back content broadcast by a first broadcast station on a first channel:
        determining that the first channel is associated with a first genre,
        determining that a second channel is associated with the first genre and has a frequency within a threshold frequency range from the first channel,
        in response to determining that the first channel is associated with the first genre, selecting, from a plurality of channels different from the first channel, the second channel based on the second channel being associated with the first genre of the first channel and the second channel having a frequency within the threshold frequency range from the first channel, and
        in response to selecting the second channel based on the second channel being associated with the first genre of the first channel, sending, to a server, a preview request identifying a call sign of a second broadcast station that broadcasts content on the second channel;
    receiving, from the server, a response to the preview request, wherein the response includes identifying information corresponding to content being broadcast on the second channel; and
    while the media playback device is playing back the content broadcast on the first channel, providing for display at least a portion of the identifying information corresponding to content being broadcast on the second channel.

16. The non-transitory computer-readable medium of claim 15, wherein the preview request comprises a frequency of the second channel and a geographic location of the media playback device.

17. The non-transitory computer-readable medium of claim 15:
    wherein the preview request identifies a set of second channels that includes the second channel, wherein the response includes respective identifying information corresponding to respective content being broadcast on each channel of the set of second channels, and wherein the set of acts further comprises selecting channels of the second set of channels based on the channels being programmed as presets of the media playback device.

18. A computing system configured for performing a set of acts comprising:

while a media playback device of a vehicle is playing back content broadcast by a first broadcast station on a first channel:

determining that the first channel is associated with a first genre, determining that a second channel is associated with the first genre and has a frequency within a threshold frequency range from the first channel, in response to determining that the first channel is associated with the first genre, selecting, from a plurality of channels different from the first channel, the second channel based on the second channel being associated with the first genre of the first channel and the second channel having a frequency within the threshold frequency range from the first channel, and in response to selecting the second channel based on the second channel being associated with the first genre of the first channel, sending, to a server, a preview request identifying a call sign of a second broadcast station that broadcasts content on the second channel;

receiving, from the server, a response to the preview request, wherein the response includes identifying information corresponding to content being broadcast on the second channel; and while the media playback device is playing back the content broadcast on the first channel, providing for display at least a portion of the identifying information corresponding to content being broadcast on the second channel.

19. The computing system of claim 18:

wherein the content broadcast on the first channel is audio content, and wherein the preview request comprises a frequency of the second channel and a geographic location of the media playback device.

* * * * *